United States Patent
Tajima et al.

(10) Patent No.: US 10,252,626 B2
(45) Date of Patent: Apr. 9, 2019

(54) CHARGER

(71) Applicant: FUJI ELECTRIC CO., LTD., Kawasaki-shi (JP)

(72) Inventors: Hirokazu Tajima, Suzuka (JP); Osamu Takei, Hino (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 292 days.

(21) Appl. No.: 15/178,682

(22) Filed: Jun. 10, 2016

(65) Prior Publication Data

US 2016/0280082 A1 Sep. 29, 2016

Related U.S. Application Data

(63) Continuation of application No. PCT/JP2014/064181, filed on May 28, 2014.

(51) Int. Cl.
*H02J 7/00* (2006.01)
*B60L 11/18* (2006.01)
(Continued)

(52) U.S. Cl.
CPC ....... *B60L 11/1812* (2013.01); *B60L 11/1838* (2013.01); *H02J 7/0029* (2013.01);
(Continued)

(58) Field of Classification Search
USPC ....................................................... 320/158
See application file for complete search history.

(56) References Cited

U.S. PATENT DOCUMENTS 5,581,171 A * 12/1996 Kerfoot ............... B60L 11/1811
320/137
5,998,960 A * 12/1999 Yamada ................... B60K 6/26
320/103
(Continued)

FOREIGN PATENT DOCUMENTS

EP 1783910 A1 5/2007
JP 1-303065 12/1989
(Continued)

OTHER PUBLICATIONS

Extended European Search Report dated Aug. 14, 2017 in corresponding European Patent Application No. 14892979.7.
(Continued)

*Primary Examiner* — Samuel Berhanu

(57) ABSTRACT

A charger with a power converting inverter that can be reliably stopped by a forced stop signal, without causing an increase in part quantity. A control power supply supplies voltage to gate drive circuits, which supply gate signals to an inverter. The control power supply includes a transformer, a power supply control circuit IC that repeatedly opens and closes a primary side circuit formed by a primary winding of the transformer and an auxiliary machine power supply being connected in series, and a rectifier that generates power supply voltage to be supplied to the gate drive circuits by rectifying AC voltage generated in a secondary winding of the transformer. The power supply control IC turns off a FET in accordance with a forced stop signal, thereby forcibly switching the primary side circuit to an open state, and stopping the supply of power supply voltage to the gate drive circuits.

12 Claims, 3 Drawing Sheets

(51) Int. Cl.
  *H02J 7/02*      (2016.01)
  *H02M 1/08*      (2006.01)
  *H02M 3/337*     (2006.01)
  *H02M 7/219*     (2006.01)
  *H02M 7/5387*    (2007.01)
  *H02M 1/00*      (2006.01)

(52) U.S. Cl.
  CPC .......... *H02J 7/0031* (2013.01); *H02J 7/0077* (2013.01); *H02J 7/022* (2013.01); *H02M 1/08* (2013.01); *H02M 3/3378* (2013.01); *H02M 7/219* (2013.01); *H02M 7/5387* (2013.01); *H02M 2001/0006* (2013.01); *H02M 2001/007* (2013.01)

(56) References Cited

U.S. PATENT DOCUMENTS 9,166,499 B2 * 10/2015 Suzuki .................. H02M 1/08

2009/0231018 A1   9/2009  Dittrich
2010/0309589 A1  12/2010  Ueki et al.

FOREIGN PATENT DOCUMENTS

| JP | 2004-282926  | 10/2004 |
| JP | 2005-110397  | 4/2005  |
| JP | 2007-66725   | 3/2007  |
| JP | 2010-284051  | 12/2010 |
| JP | 2014-073055  | 4/2014  |

OTHER PUBLICATIONS

International Search Report dated Aug. 26, 2014, in corresponding International Application No. PCT/JP2014/064181.
Notification of Reason for Refusal for Japanese Application No. 2016-523033 dated May 10, 2017.

* cited by examiner

CHARGER

CROSS-REFERENCE TO RELATED APPLICATIONS

This application is a continuation application, filed under 35 U.S.C. § 111(a), of International Application PCT/JP2014/064181 filed on May 28, 2014, the entire contents of which are hereby incorporated by reference.

BACKGROUND

1. Field

The present disclosure relates to a charger preferred as a vehicle-mounted charger or the like.

2. Related Art

As a vehicle-mounted charger used in an electric vehicle (EV) or the like, there is a vehicle-mounted charger with a configuration such that conversion of power supplied from an external power supply is implemented, and charging of a storage battery inside the EV is carried out using direct current voltage obtained as a result of the conversion. Also, among this kind of vehicle-mounted charger, there is a vehicle-mounted charger that includes an inverter as means for power conversion.

This kind of vehicle-mounted charger with a configuration including an inverter is such that output of the inverter is sometimes stopped suddenly in order to avoid an occurrence of an electrical shock accident when, for example, a vehicle failure occurs in charging.

Therefore, in the related art, a relay has been interposed between an auxiliary machine power supply of the vehicle and an internal power supply, which generates power supply voltage to be supplied to the inverter based on power supply voltage supplied from the auxiliary machine power supply, and the output of the inverter stopped suddenly by causing the relay to be turned off. Hereafter, this technology will be referred to as first related art technology.

Also, the following technology exists as technology relating to inverter stop control. In this technology, a gate signal for carrying out switching on and off of an inverter switching element is transmitted via a photocoupler. When stopping output of the inverter, a power supply that supplies bias current to a phototransistor of the photocoupler is turned off, thereby interrupting the supply of the gate signal to the inverter switching element. In this technology, a circuit that generates the gate signal and the inverter are linked via the photocoupler, because of which the power supply of the former and the power supply of the latter can be isolated. Hereafter, this technology will be referred to as second related art technology. As literature relating to the second related art technology, there is JP A 2010-284051.

SUMMARY

In the first related art technology, it is necessary to provide the relay between the auxiliary machine power supply and the internal power supply, because of which there is a problem in that the circuit scale increases. Also, in the first related art technology, the number of parts increases by the number of relays, because of which there is a problem in that the manufacturing cost increases and the circuit failure rate increases.

Also, when causing the output of the charger inverter to be stopped by utilizing the second existing technology, the following problem occurs. A gate drive circuit, which amplifies the gate signal supplied via the photocoupler to an appropriate level and supplies the gate signal to each switching element, is provided in the inverter. When transmission of the gate signal via the photocoupler is interrupted in accordance with a forced stop signal, input becomes unstable, the gate drive circuit is liable to oscillate, and there is a possibility that the inverter switching elements will be erroneously driven.

The disclosure, having been contrived in consideration of the heretofore described situation, has an aspect of providing a charger such that a power converting inverter can be reliably stopped in accordance with a forced stop signal, without causing an increase in part quantity.

The disclosure provides a charger that generates alternating current voltage using an inverter and generates direct current voltage for charging a storage battery by rectifying the alternating current voltage, the charger including a plurality of gate drive circuits that output a plurality of gate signals for carrying out switching on and off of a plurality of switching elements configuring the inverter, and a control power supply that supplies power supply voltage to the plurality of gate drive circuits, wherein the control power supply includes a transformer, a power supply control circuit that repeatedly opens and closes a primary side circuit formed by a primary winding of the transformer and a direct current power supply being connected in series, and a rectifying circuit that generates power supply voltage to be supplied to the plurality of gate drive circuits by rectifying alternating current voltage generated in a secondary winding of the transformer, and the power supply control circuit stops the opening and closing of the primary side circuit in accordance with a forced stop signal.

According to the charger, the power supply control circuit stops the opening and closing of the primary side circuit of the transformer in accordance with the forced stop signal, because of which the supply of the power supply voltage to the gate drive circuits from the rectifying circuit connected to the secondary winding of the transformer is stopped. As a result of this, the supply of the gate signals to the switching elements configuring the inverter is stopped, whereby charging of the storage battery is stopped.

Consequently, according to the disclosure, a charger such that a power converting inverter can be reliably stopped in accordance with a forced stop signal, without causing an increase in part quantity, can be realized.

BRIEF DESCRIPTION OF THE DRAWINGS

These and/or other aspects will become apparent and more readily appreciated from the following description of the embodiments, taken in conjunction with the accompanying drawings of which.

DESCRIPTION OF EMBODIMENTS

Figure 1:
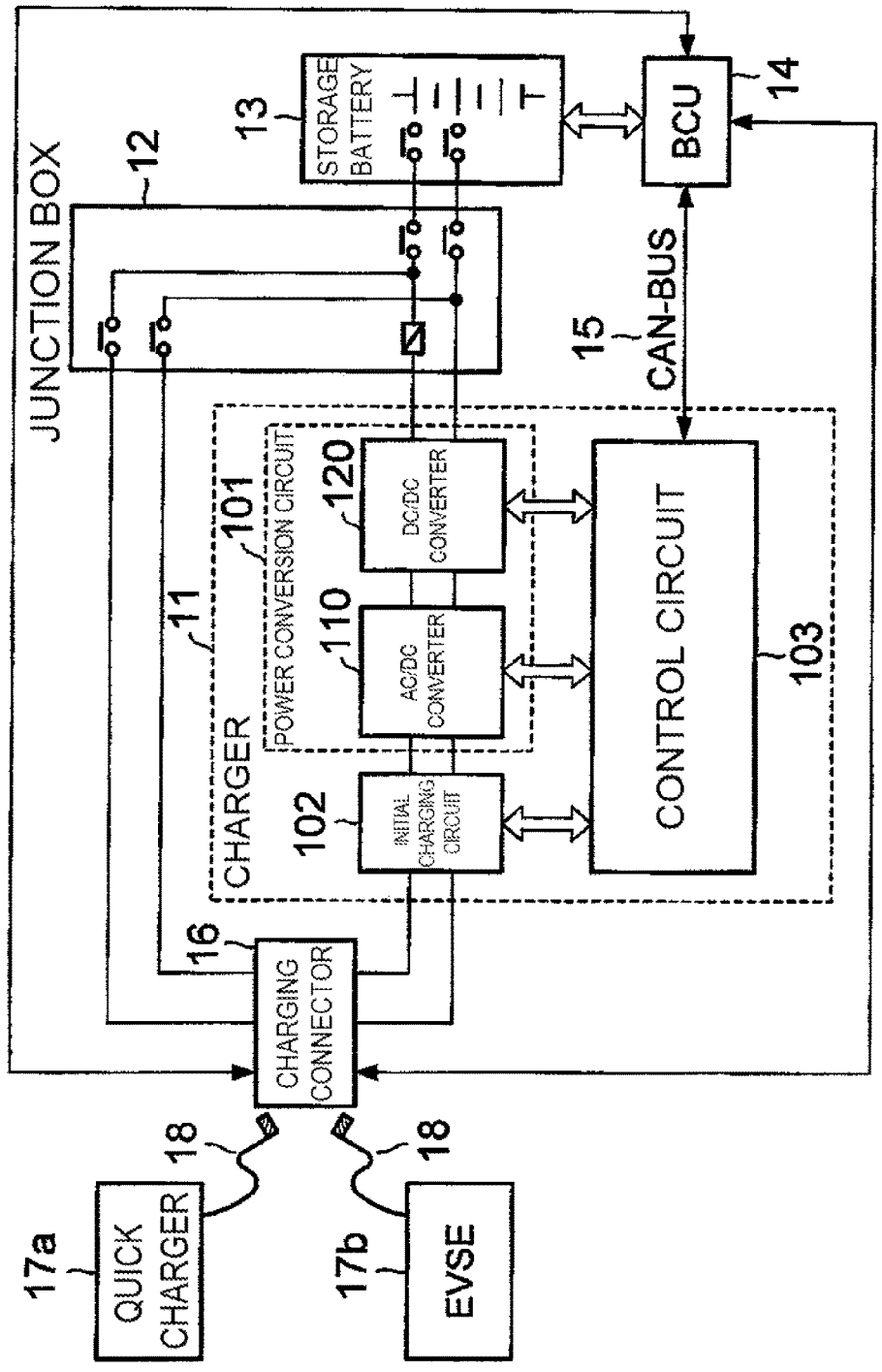
FIG. 1 is a block diagram showing a configuration of a vehicle-mounted charging system including a charger according to an embodiment of the disclosure.

Hereafter, an embodiment of the disclosure will be described while referring to the drawings. FIG. 1 is a block diagram showing a configuration of a vehicle-mounted charging system 1 including a charger 11, which is an embodiment of the disclosure. The vehicle-mounted charging system 1 has the charger 11, a junction box 12, a storage battery 13, a battery control unit (BCU) 14, and a charging connector 16, provided inside an EV. The junction box 12 carries out a relay of wiring connected to each of the charger 11, the storage battery 13, and the charging connector 16. The BCU 14 monitors the state of charge of the storage battery 13. The charging connector 16 is provided in order to connect a charging plug 18 connected to a quick charger 17a or Electric Vehicle Service Equipment (EVSE) (charging station) 17b provided on the exterior of the EV to the EV.

The charger 11 according to this embodiment has a power conversion circuit 101, an initial charging circuit 102, and a control circuit 103. Also, the power conversion circuit 101 has an AC/DC converter 110 and a DC/DC converter 120. The initial charging circuit 102 is a circuit that, at the start of a charging operation by the charger 11, limits charging current supplied to a capacitor 110-7 provided in the interior of the AC/DC converter 110 until charging voltage of the capacitor 110-7 rises to a predetermined voltage value. The control circuit 103 is connected to the initial charging circuit 102, the AC/DC converter 110, and the DC/DC converter 120, and outputs a control signal to each circuit. The control circuit 103 and the BCU 14 carry out a transmission of information using CAN communication via a CAN-BUS 15.

Figure 2:
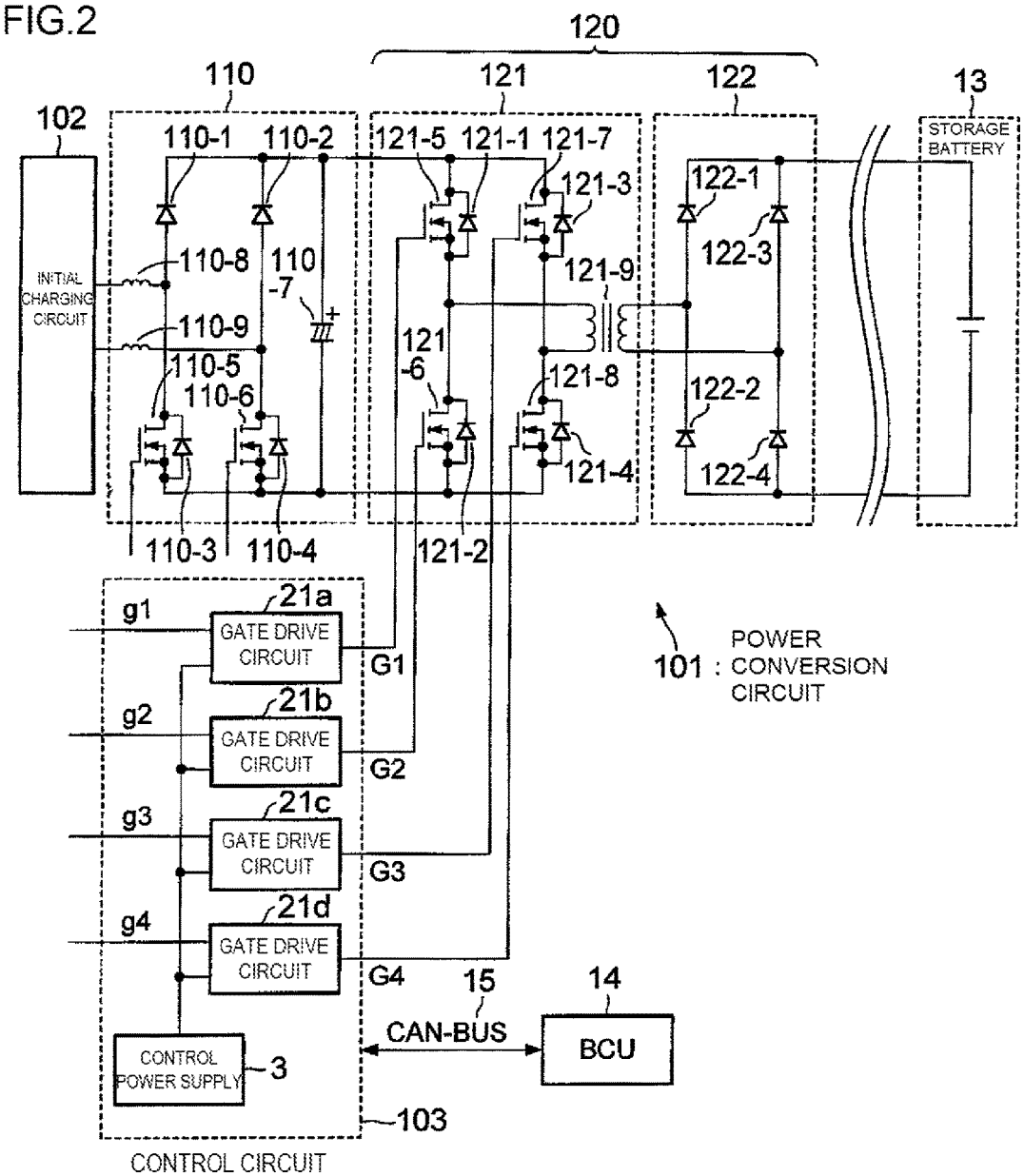
FIG. 2 is a circuit diagram showing a configuration of a power conversion circuit and a control circuit of the charger.

FIG. 2 is a circuit diagram showing a configuration of the power conversion circuit 101 and the control circuit 103. With regard to the control circuit 103, only a circuit relating to control of an inverter 121 is shown, in order to prevent the drawing from becoming complicated. The AC/DC converter 110 is configured with diodes 110-1 and 110-2, freewheel diodes 110-3 and 110-4, FETs 110-5 and 110-6, the capacitor 110-7, and reactors 110-8 and 110-9. The reactors 110-8 and 110-9 are provided in order to attenuate high frequency. The diodes 110-1 and 110-2 and the FETs 110-5 and 110-6 configure a rectifying circuit that rectifies alternating current voltage supplied from the quick charger 17a or the EVSE 17b via the initial charging circuit 102 and supplies direct current voltage to the capacitor 110-7. The capacitor 110-7 is an electrolytic capacitor provided in order to smooth the direct current voltage output from the rectifying circuit. The freewheel diodes 110-3 and 110-4 are connected in anti-parallel to the FETs 110-5 and 110-6, and cause current generated by electromagnetic energy accumulated in the reactors 110-8 and 110-9 to flow back to the input power supply side when switching the FETs 110-5 and 110-6 on and off.

The DC/DC converter 120 is configured with the inverter 121 and a rectifier 122. The inverter 121 is configured with FETs 121-5 to 121-8, freewheel diodes 121-1 to 121-4, and a transformer 121-9. The inverter 121 is a circuit that, with the direct current voltage with which the capacitor 110-7 of the AC/DC converter 110 is charged as power supply voltage, outputs alternating current voltage to a primary winding of the transformer 121-9 by switching the power supply voltage using the FETs 121-5 to 121-8. The transformer 121-9 outputs alternating current voltage in accordance with the alternating current voltage applied to the primary winding to the rectifier 122 from a secondary winding. The rectifier 122 rectifies the alternating current voltage output from the secondary winding of the transformer 121-9 using diodes 122-1 to 122-4, and supplies direct current voltage to the storage battery 13.

The control circuit 103 is configured with gate drive circuits 21a to 21d and a control power supply 3. The gate drive circuits 21a to 21d generate gate signals G1 to G4 having levels appropriate for switching the FETs 121-5 to 121-8 on and off in accordance with pulse width modulated gate signals g1 to g4 generated by an unshown gate signal generating unit, and output the gate signals G1 to G4 to the gates of the FETs 121-5 to 121-8, respectively.

Figure 3:
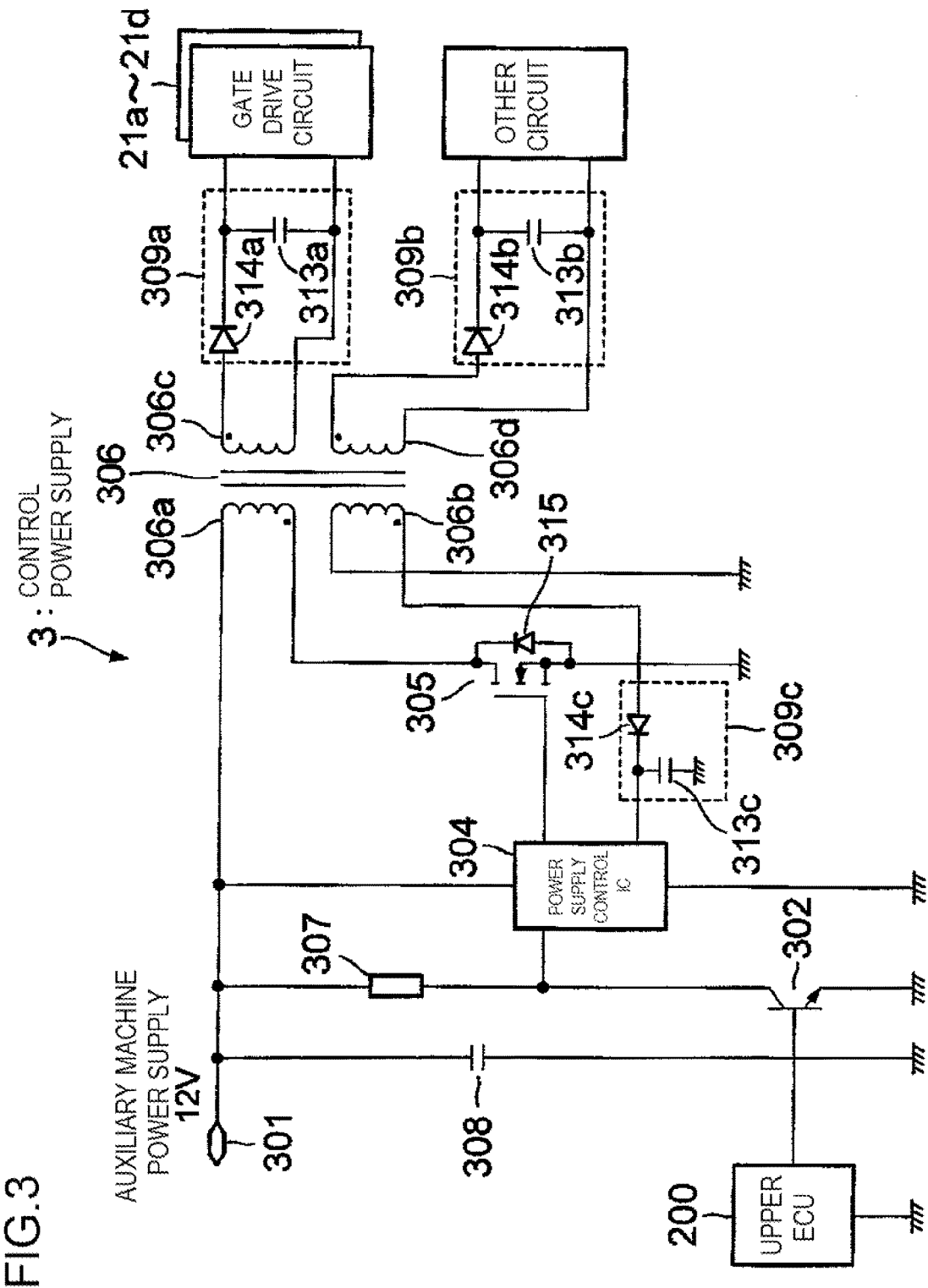
FIG. 3 is a circuit diagram showing a configuration of a control power supply of the charger.

FIG. 3 is a circuit diagram showing a configuration of the control power supply 3. The control power supply 3 is a circuit that operates by utilizing input power supply voltage applied to an input power supply terminal 301, and generates power supply voltage to be applied to the gate drive circuits 21a to 21d and power supply voltage to be supplied to another circuit. In this embodiment, an auxiliary machine power supply (an example of a direct current power supply) is connected to the input power supply terminal 301. The auxiliary machine power supply is a power supply provided in order to supply power to an auxiliary machine, such as an air conditioner and a car stereo, of the vehicle in which the vehicle-mounted charging system 1 is mounted. In this embodiment, a voltage value of the auxiliary machine power supply is 12V.

As shown in FIG. 3, the control power supply 3 has a transistor 302, a power supply control IC 304, a FET 305, a transformer 306, a resistance 307, a capacitor 308, rectifiers 309a to 309c, and a freewheel diode 315.

The capacitor 308 is interposed between the input power supply terminal 301 and a ground wire. The capacitor 308 is for removing noise from the power supply voltage applied to the input power supply terminal 301.

The transformer 306 has one primary winding 306a and three secondary windings 306b, 306c, and 306d. Herein, one end of the primary winding 306a is connected via the input power supply terminal 301 to the auxiliary machine power supply, while the other end of the primary winding 306a is connected to a drain of the FET 305. Further, the source of the FET 305 is grounded. The freewheel diode 315 is connected in anti-parallel to the FET 305. In this way, a primary side circuit formed by the auxiliary machine power supply connected to the input power supply terminal 301, the primary winding 306a of the transformer 306, and the FET 305 being connected in series is formed in this embodiment. Also, one end of the secondary winding 306b is grounded, while the other end of the secondary winding 306b is connected to the power supply control IC 304 via the rectifier 309c, which is formed with a capacitor 313c and a diode 314c.

An emitter of the NPN transistor 302 is grounded, while a collector of the NPN transistor 302 is connected via the resistance 307 to the input power supply terminal 301. The NPN transistor 302 is switched on and off by an upper engine control unit (ECU) 200 provided inside the vehicle. The upper ECU 200 is connected to a ground wire shared with the primary side circuit of the transformer 306 in the control power supply 3. In a period in which no forced stop signal is being generated, the upper ECU 200 turns the NPN transistor 302 on. Also, when a forced stop signal is generated, the upper ECU 200 turns the NPN transistor 302 off.

In one aspect, a forced stop signal is generated in accordance with, for example, an operation of an operator provided in a charging station on the exterior of the vehicle, and supplied to the upper ECU 200. In another aspect, a forced stop signal is generated based on a failure detection signal generated when a failure of the vehicle, the auxiliary machinery of the vehicle, or the like, is detected.

The power supply control IC 304 is an IC having a pulse width modulation (PWM) function, and is configured with, for example, a microcomputer. The power supply control IC 304 determines whether or not a forced stop signal exists, by comparing collector voltage of the NPN transistor 302 with a predetermined threshold. Further, at a time of normal operation when no forced stop signal is being generated, the power supply control IC 304 cyclically opens and closes the primary side circuit including the primary winding 306a by applying a pulse train of a constant cycle to a gate of the FET 305. Thereby, alternating current voltage is output from the secondary windings 306b, 306c, and 306d. The alternating current voltage output from the secondary winding 306b is rectified by the rectifier 309c, and supplied as direct current voltage to the power supply control IC 304. Further, the power supply control IC 304 controls a pulse width of the pulse train supplied to the FET 305 so that the direct current voltage supplied via the rectifier 309c reaches a predetermined target value.

Also, when detecting the generation of a forced stop signal based on the collector voltage of the NPN transistor 302, the power supply control IC 304 stops the supply of the pulse train to the gate of the FET 305 to forcibly turn the FET 305 off. Thereby, the primary side circuit including the primary winding 306a switches to an open state, and the output of alternating current voltage from the secondary windings 306b, 306c, and 306d is stopped.

The rectifier 309a is configured with a capacitor 313a and a diode 314a, and rectifies the alternating current voltage output from the secondary winding 306c of the transformer 306, thereby converting the alternating current voltage to direct current voltage. In the same way, the rectifier 309b is configured with a capacitor 313b and a diode 314b, and rectifies the alternating current voltage output from the secondary winding 306d of the transformer 306, thereby converting the alternating current voltage to direct current voltage. Voltage output from the rectifier 309a is supplied as power supply voltage to the gate drive circuits 21a to 21d, and voltage output from the rectifier 309b is supplied as power supply voltage to a circuit other than the gate drive circuits 21a to 21d.

Hereafter, a description will be given of an operation of the vehicle-mounted charging system 1 including the charger 11 according to this embodiment. In FIG. 1, an operator connects the charging plug 18 connected to the quick charger 17a or the EVSE 17b to the EV charging connector 16 in order to carry out charging of the storage battery 13. At this time, an instruction to start charging is transmitted from the EV, and charging of the storage battery 13 is started under monitoring of the state of charge and discharge by the BCU 14. Alternating current voltage output from the quick charger 17a or the like is input via the charging connector 16 to the charger 11.

The alternating current voltage input to the charger 11 is applied to the AC/DC converter 110 via the initial charging circuit 102 shown in FIG. 2. The alternating current voltage that has passed through the initial charging circuit 102 is rectified by the AC/DC converter 110, and the capacitor 110-7 is charged by direct current voltage obtained as a result of the rectification.

The direct current voltage with which the capacitor 110-7 of the AC/DC converter 110 is charged is applied as power supply voltage to the inverter 121. The gate signals G1 to G4 are applied to the FETs 121-5, 121-6, 121-7, and 121-8 of the inverter 121 from the gate drive circuits 21a to 21d respectively. To describe in further detail, the gate drive circuits 21a to 21d cause the pair of FETs 121-5 and 121-8 and the pair of FETs 121-7 and 121-6 to be turned on alternately by causing the gate signals G1 to G4 to vary, thereby causing alternating current voltage to be output to the primary winding of the transformer 121-9.

Thereby, alternating current voltage is generated in the secondary winding of the transformer 121-9. The alternating current voltage of the secondary winding is rectified by the rectifier 122, thus being converted into direct current voltage. The direct current voltage is output to the storage battery 13 via the junction box 12 shown in FIG. 1, whereby the storage battery 13 is charged.

In FIG. 3, the transistor 302 is in an on-state when no forced stop signal is being generated. Therefore, the power supply control IC 304 outputs a pulse train that causes the FET 305 to be turned on and off. Thereby, alternating current voltage is applied to the primary winding 306a of the transformer 306, and alternating current voltage is output from the secondary windings 306b, 306c, and 306d of the transformer 306. The alternating current voltages output from the secondary windings 306c and 306d are rectified by the rectifiers 309a and 309b, whereby each is converted into direct current voltage. The direct current voltage output from the rectifier 309a is supplied as power supply voltage to the gate drive circuits 21a to 21d.

When a forced stop signal is generated, the upper ECU 200 turns the transistor 302 off. As a result of this, the power supply control IC 304 stops the output of the pulse train to the gate of the FET 305, thereby forcibly turning the FET 305 off. As a result of this, no alternating current voltage is applied to the primary winding 306a of the transformer 306, and the output of alternating current voltage from the secondary windings 306b, 306c, and 306d of the transformer 306 is stopped. Therefore, the rectifier 309a stops the supply of power supply voltage to the gate drive circuits 21a to 21d. When the supply of power supply voltage is stopped, the gate drive circuits 21a to 21d stop the output of the gate signals G1 to G4, whereby all of the FETs 121-5 to 121-8 of the inverter 121 are turned off. As a result of this, the application of alternating current voltage to the transformer 121-9 is stopped, whereby the output of voltage from the rectifier 122 on the secondary side of the transformer 121-9 is stopped. Further, the charging of the storage battery 13 is stopped.

According to the heretofore described embodiment, the following advantages are obtained.

Firstly, in the heretofore described first related art technology, it is necessary to provide a relay between the input power supply terminal 301 and auxiliary machine power supply in this embodiment. Therefore, there is a problem in that the charger circuit scale increases. Also, as the number of parts increases by the number of relays, there is a problem in that the manufacturing cost increases and the circuit failure rate increases.

As opposed to this, this embodiment is such that the relay necessary in the first related art technology is unnecessary. Therefore, the problem occurring in the first related art technology does not occur.

Also, in the second related art technology, the gate signals g1 to g4 in this embodiment are supplied to the inverter 121 via a photocoupler. Herein, when transmission of the gate signals via the photocoupler is interrupted in accordance with a forced stop signal, the power supply remains connected to the gate drive circuits, because of which input becomes unstable, the gate drive circuits oscillate, and there is a possibility that the inverter switching elements will be erroneously driven.

As opposed to this, this embodiment is such that the power supply control IC 304 forcibly switches the primary side circuit of the transformer 306, which is the source of supplying power supply voltage to the gate drive circuits 21a to 21d, to an open state in accordance with a forced stop signal, because of which the operation of the gate drive circuits 21a to 21d can be reliably stopped, and charging of the storage battery 13 can be reliably stopped.

Furthermore, this embodiment is such that the power supply control IC 304 and the upper ECU 200 that transmits a forced stop signal to the power supply control IC 304 are connected to a shared ground wire. Consequently, there is no need to interpose an element such as a photocoupler for insulation in this path. Consequently, there is no need to provide an element for insulation, such as a photocoupler, in a forced stop signal transmission path between the upper ECU 200 and the power supply control IC 304. Consequently, the manufacturing cost of the charger 11 can be reduced.

Other Embodiments

Heretofore, an embodiment of the disclosure has been described, but other embodiments of the disclosure are conceivable. Examples are as follows.

(1) In the heretofore described embodiment, a relay may be interposed between the input power supply terminal 301 and the auxiliary machine power supply. By so doing, duplication of the charge stopping function can be achieved, and charging can more reliably be stopped.

(2) The charger in the heretofore described embodiment is applicable not only to a vehicle-mounted charger, but also to a railroad car-mounted or aircraft-mounted charger.

(3) In the heretofore described embodiment, a forced stop signal may be generated when any of multiple kinds of events occurs.

Any identification in this disclosure of problems, deficiencies, or other characterizations of any product or method of the related art does not imply or admit that such problems, deficiencies, or other characterizations were known in the prior art even if the product or method itself was known in the prior art.

Although a few embodiments have been shown and described, it would be appreciated by those skilled in the art that changes may be made in these embodiments without departing from the principles and spirit of the, the scope of which is defined in the claims and their equivalents.

Reference signs and numerals are as follows:
1 Vehicle-mounted charging system,
11 Charger,
101 Power conversion circuit,
102 Initial charging circuit,
103 Control circuit,
110 AC/DC converter,
110-5, 110-6, 121-5, 121-6, 121-7, 121-8, 305 FET,
110-7, 308, 313a, 313b, 313c Capacitor,
110-3, 110-4, 121-1, 121-2, 121-3, 121-4, 315 Freewheel diode,
110-1, 110-2, 122-1, 122-2, 122-3, 122-4, 314a, 314b, 314c Diode,
110-8, 110-9 Reactor,
121-9, 306 Transformer,
120 DC/DC converter,
121 Inverter,
12 Junction box,
13 Storage battery,
14 BCU,
15 CAN-BUS,
16 Charging connector,
17a Quick charger,
17b EVSE,
18 Charging plug,
21-a, 21-b, 21-c, 21-d Gate drive circuit,
g1, g2, g3, g4, G1, G2, G3, G4 Gate signal,
3 Control power supply,
301 Input power supply terminal,
302 Transistor,
200 upper ECU,
304 Power supply control IC,
307 Resistance,
309a, 309b, 309c Rectifier.

What is claimed is:

1. A charger configured to generate alternating current voltage using an inverter and generate direct current voltage for charging a storage battery by rectifying the alternating current voltage, the charger comprising:
    a plurality of gate drive circuits configured to output a plurality of gate signals to carry out switching on and off of a plurality of switching elements configuring the inverter; and
    a control power supply configured to supply power supply voltage to the plurality of gate drive circuits, the control power supply including
        a transformer having a primary winding,
        a power supply control circuit configured to
            carry out repeatedly opening and closing a primary side circuit formed when the primary winding and a direct current power supply are connected in series, and
            stop the opening and closing of the primary side circuit in accordance with a forced stop signal, and
        a rectifying circuit configured to generate power supply voltage to be supplied to the plurality of gate drive circuits by rectifying alternating current voltage generated in a secondary winding of the transformer.

2. The charger according to claim 1, wherein
the control power supply includes a switching element connected in series to the primary winding, such that the switching element is also connected in series to the direct current power supply in the primary side circuit, and
the power supply control circuit is configured to carry out the opening and closing of the primary side circuit by outputting a pulse train that causes the switching element of the control power supply to be turned on and off.

3. The charger according to claim 1, wherein
the power supply control circuit switches the primary side circuit to an open state in accordance with the forced stop signal, by switching the switching element of the primary side circuit to an open state.

4. The charger according to claim 2, wherein
the control power supply has an input power supply terminal, to which the direct current power supply connects when the primary side circuit is formed,
the input power supply terminal is connected to one end of the primary winding, and
the switching element of the control power supply is connected to another end of the primary winding.

5. The charger according claim 4, wherein the switching element of the control power supply is connected between the another end of the primary winding and ground.

6. The charger according to claim 1, further comprising:
    a transistor grounded by a ground wire shared with the power supply control circuit; and
    an upper controller, also grounded by the ground wire, configured to switch the transistor on and off in accordance with the forced stop signal,
    wherein the power supply control circuit is configured to detect the forced stop signal by detecting whether the transistor is in an on-state or an off-state.

7. The charger according to claim 1, wherein the forced stop signal is applied from an exterior of the charger.

8. The charger according to claim 1, wherein the forced stop signal is generated by an occurrence of an event.

9. The charger according to claim 2, further comprising:
a second rectifying circuit configured to rectify alternating current voltage generated in another secondary winding of the transformer,
wherein the power supply control circuit receives an output voltage from a second rectifying circuit.

10. A vehicle-mounted charging system including the charger according to claim 1.

11. The charger according to claim 1, further comprising:
a transistor, controlled by the power supply control circuit, to open and close the primary side circuit;
a second rectifying circuit configured to rectify an alternative current voltage output from the transformer to obtain a direct current voltage,
wherein the power supply control circuit is configured to
detect the direct current voltage obtained by the second rectifying circuit, and
carry out the repeatedly opening and closing the primary side circuit by supplying a pulse train to the transistor controlled by the power supply control circuit, and control a pulse width of the pulse train so that the direct current voltage obtained by the second rectifying circuit reaches a predetermined target value.

12. The charger according to claim 6, wherein the upper controller is an upper engine control unit (ECU).

* * * * *

UNITED STATES PATENT AND TRADEMARK OFFICE
CERTIFICATE OF CORRECTION

PATENT NO. : 10,252,626 B2
APPLICATION NO. : 15/178682
DATED : April 9, 2019
INVENTOR(S) : Hirokazu Tajima et al.

Page 1 of 1

It is certified that error appears in the above-identified patent and that said Letters Patent is hereby corrected as shown below:

In the Claims

In Column 8, Line 56:
In Claim 5, after "according" insert -- to --.

Signed and Sealed this
Twenty-fifth Day of June, 2019

Andrei Iancu
*Director of the United States Patent and Trademark Office*